(12) United States Patent
Ooishi et al.

(10) Patent No.: US 7,174,914 B2
(45) Date of Patent: Feb. 13, 2007

(54) COUPLER

(75) Inventors: Yasushi Ooishi, Yokohama (JP); Kazuhiro Teraguchi, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/232,979

(22) Filed: Sep. 23, 2005

(65) Prior Publication Data
US 2006/0065312 A1    Mar. 30, 2006

(30) Foreign Application Priority Data
Sep. 27, 2004    (JP) .............................. 2004-279467

(51) Int. Cl.
*F16L 37/28*    (2006.01)
(52) U.S. Cl. ............................ 137/614.03; 137/614.04; 251/149.1; 251/149.8
(58) Field of Classification Search .......... 137/614.03, 137/614.04; 251/149.1, 149.8; 141/350
See application file for complete search history.

(56) References Cited

U.S. PATENT DOCUMENTS

| | | | | |
|---|---|---|---|---|
| 3,024,044 A | * | 3/1962 | Benevento | .................. 137/269 |
| 3,966,239 A | * | 6/1976 | Heckenkamp | ............... 285/316 |
| 4,106,523 A | * | 8/1978 | Thornton et al. | ...... 137/614.04 |
| 4,903,741 A | * | 2/1990 | Ibanez | .......................... 141/350 |
| 6,063,062 A | * | 5/2000 | Paradis | ........................ 604/249 |
| 6,152,900 A | * | 11/2000 | Mayer | .................... 604/167.02 |
| 6,463,957 B1 | * | 10/2002 | Ozawa | .................. 137/614.04 |
| 6,651,955 B2 | * | 11/2003 | Anderson | ................ 251/149.1 |

* cited by examiner

*Primary Examiner*—A. Michael Chambers
(74) *Attorney, Agent, or Firm*—Oblon, Spivak, McClelland, Maier & Neustadt, P.C.

(57) ABSTRACT

A female coupler comprises a valve support accommodated in a hole portion of the injection port and comprising a projecting portion having a axial hole, a cylindrical coupler main body placed around the projecting portion and comprising a locking projecting portion on an inner peripheral surface, a part of the main body being embedded in the injection port so as to have its position fixed, a base valve accommodated in the main body and having an fitting insertion portion inserted into the axial hole and a valve seat portion placed on the projecting portion, the fitting insertion portion and the valve seat portion being connected together, a bar-like portion projected from the valve seat portion and having valve grooves formed on a peripheral surface, and an deformable packing member placed on the valve seat portion and accommodating the bar-like portion, the packing member being fixedly retained in the main body.

7 Claims, 8 Drawing Sheets

COUPLER

CROSS-REFERENCE TO RELATED APPLICATIONS

This application is based upon and claims the benefit of priority from prior Japanese Patent Application No. 2004-279467, filed Sep. 27, 2004, the entire contents of which are incorporated herein by reference.

BACKGROUND OF THE INVENTION

1. Field of the Invention

The present invention relates to a female coupler attached to a cell container (liquid tank) for a fuel cell mounted in a mobile apparatus such as a cellular phone and a male coupler attached to a liquid retaining container used to supply the fuel cell with a cell solution such as methanol.

2. Description of the Related Art

In general, a coupler is attached to each of a cell container (liquid tank) for a fuel cell mounted in a mobile apparatus such as a cellular phone and a liquid retaining container in which a cell solution such as methanol is stored. If the cell container is to be supplied with the cell solution from the liquid retaining container, an operator joins the couplers together and then performs a supplying operation.

A system was initially adopted in which a wide-mouthed male coupler (injection port) was attached to the liquid retaining container whereas a wide-mouthed female coupler (socket) was attached to the cell container so that the cell solution from the male coupler could be injected into the female coupler.

However, in the cell container mounted in the mobile apparatus, the socket of the cell container is very small (diameter: 6 mm). Accordingly, the operator must be sufficiently careful not to spill or leak the cell solution during injection.

Methanol, the cell solution, is volatile and flammable, so that the leakage of the solution may adversely affect human beings or cause fire. Thus, means have been requested which allows every user to easily supply the solution.

Thus, a coupler having a threaded structure is conventionally attached to each of the cell container (liquid tank) of the fuel cell and the liquid retaining container in which the cell solution such as methanol is stored.

That is, a female coupler on which an internal thread is formed is attached to an inner peripheral surface of the injection port of the cell container. Further, a male coupler on which an external thread is formed is attached to an outer peripheral surface of a supply port of the cell container.

A cap is normally screwed around each of the external thread of the male coupler and the internal thread of the female coupler. These caps tightly contact the injection port of the cell container and the supply port of the liquid retaining container respectively.

For the supply of the cell solution, both caps are removed and the external thread of the male coupler is screwed into the internal thread of the female coupler. This connects the male and female coupler together to allow the cell solution from the liquid retaining container to be supplied to the cell container.

Moreover, a hook structure may be adopted as another means. That is, a plurality of tongue pieces are provided integrally on the injection port of the cell container at intervals of 120°. Pawls are provided integrally on an end surface of the supply port of the liquid retaining container at positions corresponding to the tongue pieces.

Normally, a stopper is inserted into the injection port of the cell container, and a cap closes the supply port of the liquid retaining container. That is, the injection port of the cell container and the liquid retaining container are each sealed.

For the supply of the cell solution, the stopper and the cap are removed. The pawls on the supply port are rotatively moved through 120° with respect to the tongue pieces of the liquid retaining container to engage the tongue pieces with the pawls. This connects the injection port directly to the supply port for communication. Consequently, the cell container can be supplied with the cell solution from the liquid retaining container.

In all these structures, packing is provided in desired location so as to prevent accidents such as solution leakage during the normal state or while the cell solution is being supplied.

Thus, sufficient safety measures have been taken but all these measures present a problem with the operability during the supply. That is, the threaded structure requires the liquid tank to be rotated a number of times. This is cumbersome. In this regard, the pawl structure advantageously has only to be rotatively moved through 120°. However, since the amount of this rotative movement is small, the operator may exert an excessive force to damage the pawls. Accordingly, the pawl structure is not so durable.

Further, when the fuel cell is used over a long time, a gas resulting from electrolysis is filled into the cell container to increase the pressure in the cell container. Thus, even though the female and male couplers are connected together, which are attached to the cell container and the liquid retaining container, respectively, the internal pressure of the cell container precludes the easy injection of the cell solution unless the interior of the cell container is deaerated.

BRIEF SUMMARY OF THE INVENTION

The present invention is made in view of the above circumstances. It is an object of the present invention to provide a female coupler and a male coupler which can be easily operated and which are free from solution spillage or leakage, both female coupler and male coupler having a high reliability.

To accomplish this object, the female coupler according to the present invention is provided at an injection port in a liquid tank. The female coupler is normally closed and is opened when a liquid is supplied to the liquid tank. The female coupler comprises a valve support accommodated in a hole portion of the injection port and comprising a projecting portion having a axial hole formed along an axis of the injection port, a cylindrical coupler main body placed around a periphery of the projecting portion of the valve support and comprising a locking projecting portion on an inner peripheral surface, a part of the coupler main body being embedded in the injection port so as to have its position fixed, a base valve accommodated in the coupler main body and having an fitting insertion portion inserted into the axial hole in the valve support and a valve seat portion placed on the projecting portion of the valve support, the fitting insertion portion and the valve seat portion being connected together, a bar-like portion projected from the valve seat portion of the base valve and having a plurality of valve grooves formed on a peripheral surface along an axial direction, and an elastically deformable packing member placed on the valve seat portion of the base valve and accommodating the bar-like portion, the packing member being partly fixedly retained in the coupler main body.

In a normal state, the packing member is partly sandwiched between the valve seat portion of the base valve and the locking projecting portion of the coupler main body to retain a sealed state. The bar-like portion of the base valve is pressed to elastically deform the projecting portion of the valve support via the valve seat portion to form a gap between the valve seat portion and an end surface of the packing member. As a result, a liquid flows from the valve grooves through the gap between the valve seat portion and the packing member and is then filled into an interior of the liquid tank.

To accomplish the above object, the male coupler according to the present invention is provided at a supply port in a liquid retaining container. The male coupler is normally closed and is opened when a liquid from the liquid retaining container is supplied to the exterior. The male coupler comprises a cartridge holder attached to the supply port and comprising, at its leading end, a valve seat and a supply hole which is in communication with the valve seat, a cartridge valve comprising a valve body comprising a valve portion inserted into a leading end of the cartridge holder and abutting against the valve seat to close the supply hole and a base portion provided at a proximal end of the valve body, only a peripheral portion of the base portion being fixedly sandwiched between the supply port and the cartridge holder, and a hole portion formed in the base portion of the cartridge valve.

In a normal state, the valve portion of the cartridge valve abuts against the valve seat located at the leading end of the cartridge holder to retain a sealed state. The valve body of the cartridge valve is pressed through the supply hole to elastically deform the base portion of the cartridge valve to form a gap between the valve portion of the valve body and the valve seat. As a result, a liquid is supplied to the exterior through the gap.

The present invention is effective for allowing the couplers to be easily operated, preventing solution spillage and leakage, and improving reliability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

With reference to the drawings, description will be given below of a coupler according to an embodiment of the present invention.

Figure 1:
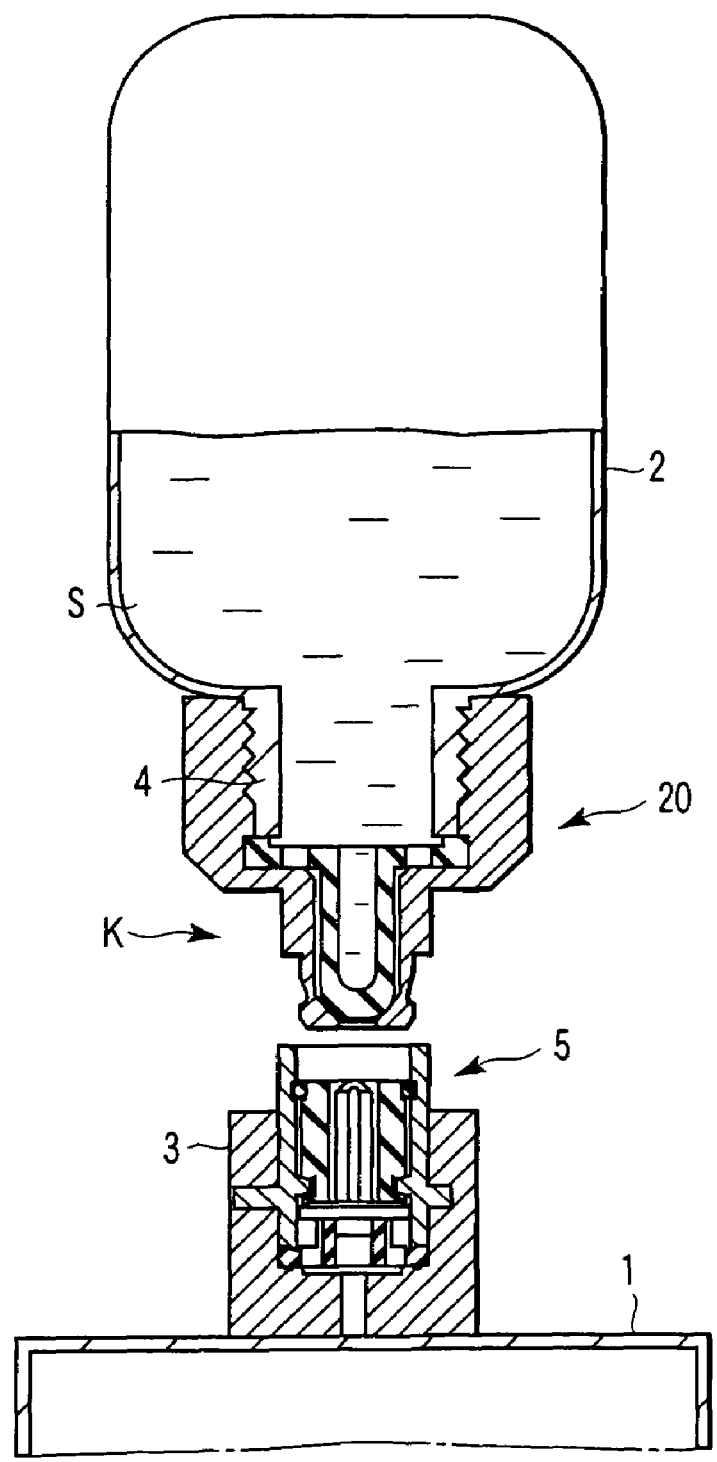
FIG. 1 is a sectional view of a male coupler and a female coupler with which a cell solution from a supply container is supplied to a cell container according to an embodiment of the present invention.

FIG. 1 shows the configuration of a fuel cell coupler K in a position in which, for example, a cell solution S is supplied.

Reference numeral 1 at the bottom of FIG. 1 denotes a cell container (solution tank) constituting a fuel cell. Reference numeral 2 at the top of FIG. 1 denotes a supply container (liquid retaining container) in which the cell solution S is stored. When the cell solution S from the supply container 2 is supplied to the cell container 1, the supply container 2 takes a position shown in FIG. 1. However, in a normal state, the supply container 2 is maintained in a position in which it is turned upside down.

An injection port 3 is projected from the upper end of the cell container 1. A supply port 4 is projected from the lower end of the supply container 2 in FIG. 1. A female coupler 5 is attached to the injection port 3 in the cell container 1. A male coupler 20 is attached to the supply port 4 in the supply container 2. The fuel cell coupler K is composed of the female coupler 5 and the male coupler 20.

First, a detailed description will be given of the female coupler 5 attached to the injection port 3 in the cell container 1.

The injection port 3 comprises a first hole portion 6a extended from its leading end surface toward the cell container 1 and having a larger diameter and a second hole portion 6b that is in communication with the first hole portion 6a and the interior of the cell container 1 and having a smaller diameter. The first hole portion 6a accommodates a valve support 7 (described later), a coupler main body 8, a base valve 9, and a packing member 10.

That is, the valve support 7 is accommodated at the bottom of the first hole portion 6a. The coupler main body 8 rests on the periphery of the valve support 7. The base valve 9 and the packing member 10 are inserted into the coupler main body 8. The base valve 9 rests on a projecting portion 7b (described later) of the valve support 7. Moreover, the packing member 10 rests on the base valve 9.

Figure 3A:
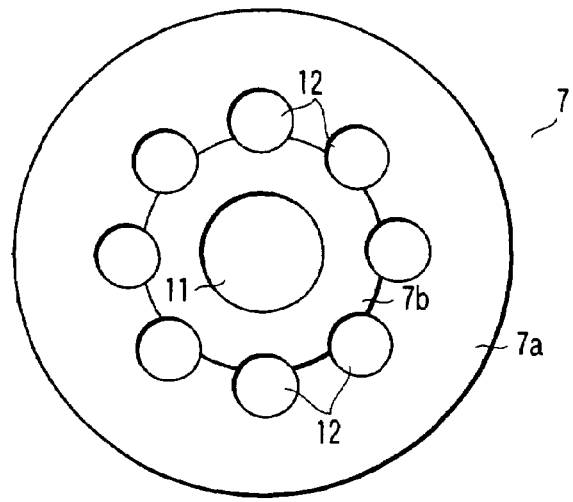
FIG. 3A is a plan view of a valve support according to the embodiment.
Figure 3B:
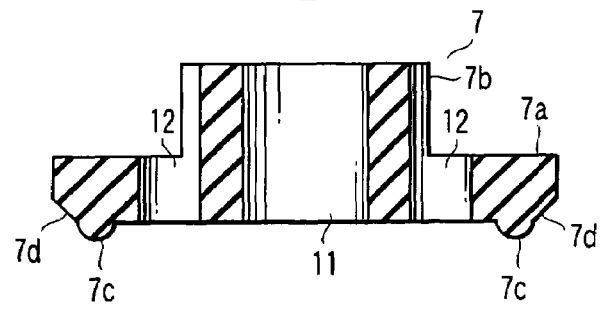
FIG. 3B is a sectional view of the valve support according to the embodiment.
Figure 3C:
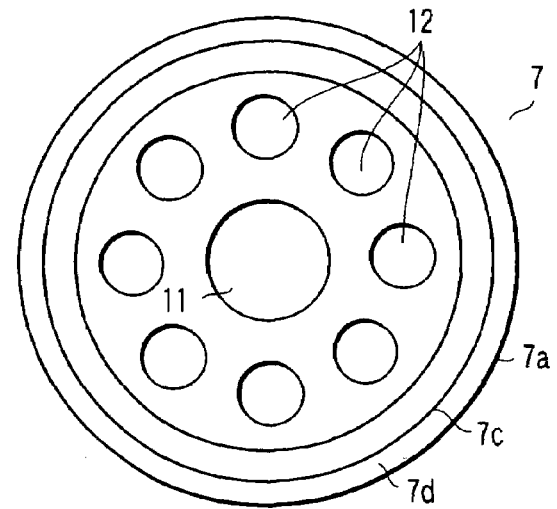
FIG. 3C is a bottom view of the valve support according to the embodiment.

FIG. 3A is a plan view of the valve support 7. FIG. 3B is a sectional view of valve support 7. FIG. 3C is a bottom view of the valve support 7.

The valve support 7 is made of an elastic material such as rubber. The valve support 7 comprises a substantially circular base portion 7a and the projecting portion 7b projecting upward from the axial portion of the base portion 7a. An axial hole 11 is formed in the projecting portion 7b along its axis. A plurality of guide holes 12 are formed around the axis at fixed intervals so as to span the base portion 7a and projecting portion 7b. That is, on a peripheral surface of the projecting portion 7b, each of the guide holes 12 is a semicircular groove portion formed along the axis of the projecting portion 7b. In the base portion 7a, the guide hole 12 is a full circle-like hole portion penetrating the base portion 7a.

A protruding portion 7c is formed on the bottom surface of the base portion 7a of the valve support 7 concentrically with the guide holes 12 so as to integrally surround the guide holes 12. An inclined portion 7d connects an outer peripheral end of the protruding portion 7c to an outer peripheral surface of the base portion 7a; the inclined portion 7d has a cross section inclined with respect to a horizontal plane.

Figure 2A:
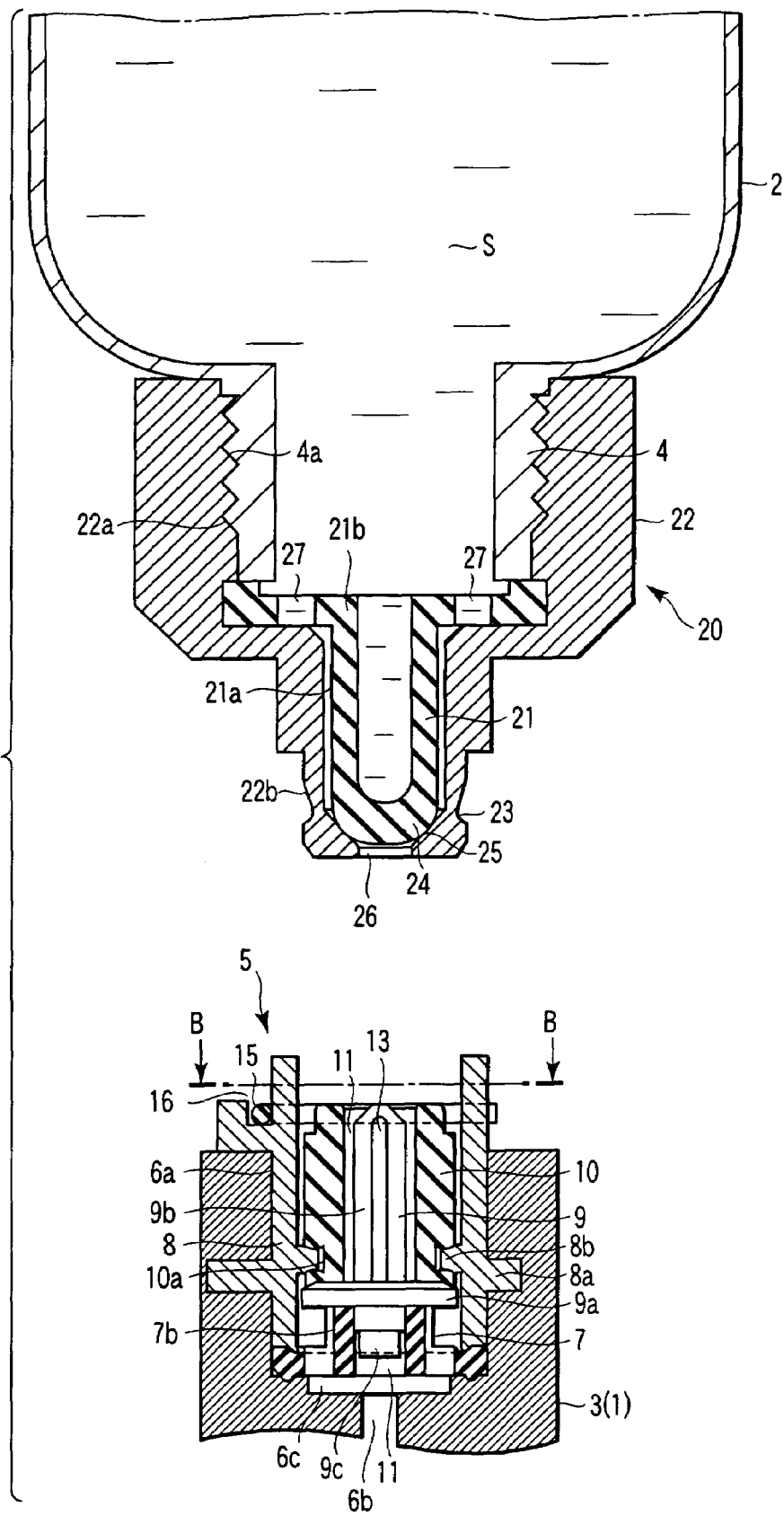
FIG. 2A is an enlarged sectional view showing a fuel cell coupler according to the embodiment.

As shown in FIG. 2A, a concave portion 6c is formed in the junction between the first hole portion 6a and second hole portion 6b of the injection port 3. The diameter of the concave portion 6c is smaller than that of the first hole portion 6a and is larger than that of the second hole portion 6b. The protruding portion 7c formed on the valve support 7 rests on the bottom surface of the first hole portion 6a. The guide hole 12 and axial hole 11 in the valve support 7 lie opposite the concave portion 6c. A space portion is formed between the concave portion 6c and the bottom surface of the base portion 7a.

The coupler main body 8 is shaped like a cylinder having an open upper end surface and an open lower end surface. A flange portion 8a is formed integrally on the lower part of outer peripheral surface of the coupler main body 8; the flange portion 8a projects outward from the coupler main body 8. The flange portion 8a is embedded in a groove portion formed in the inner periphery of the injection port 3.

A locking projecting portion 8b is formed integrally in the inner circumferential surface of the coupler main body 8 so as to project toward the interior of the coupler main body 8. The locking projecting portion 8b is located above the flange portion 8a. The locking projecting portion 8b extends into an engaging concave portion 10a formed in an outer peripheral surface of the packing member 10. The base valve 9 is placed on the projecting portion 7b of the valve support 7. Moreover, the packing body 10 is placed on the base valve 9.

Figure 4A:
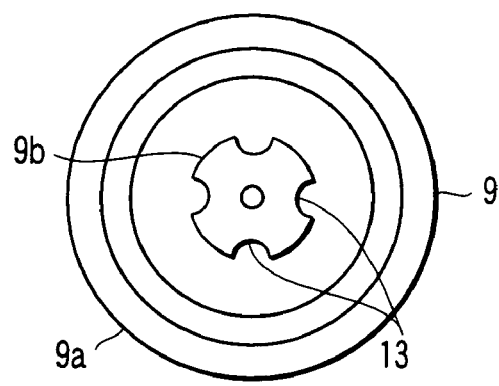
FIG. 4A is a plan view of a base valve according to the embodiment.
Figures 4B, 4C:
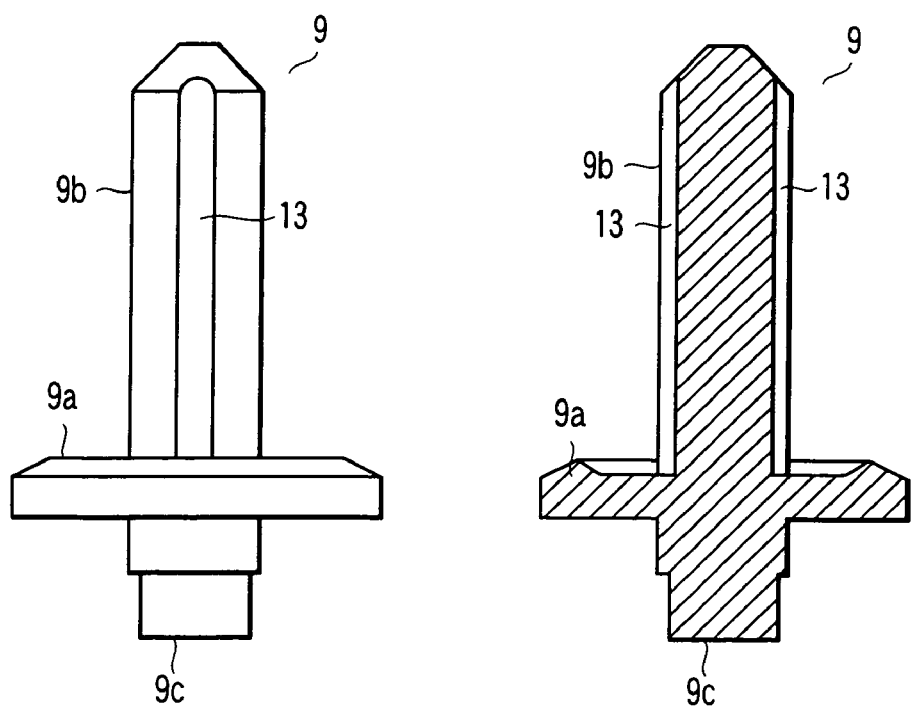
FIG. 4B is a front view of the base valve according to the embodiment.
FIG. 4C is a sectional view of the base valve according to the embodiment.

FIG. 4A is a plan view of the base valve 9. FIG. 4B is a front view of the base valve 9. FIG. 4C is a sectional view of the base valve 9.

The base valve 9 is formed of a synthetic resin material or a metal material. The base valve 9 is composed of a disk-like valve seat portion 9a, a bar-like portion 9b projecting upward from the axial position of the valve seat portion 9a and having a sharpened leading end, and a fitting insertion portion 9c projecting downward from the axial position of the valve seat portion 9a.

An annular portion is formed on the top surface of the valve seat portion 9a at its outermost position; the annular portion has a tapered cross section. A concave portion is formed inside the annular portion. The diameter of the valve seat portion 9a is slightly smaller than the inner diameter of the coupler main body 8. This enables the base valve 9 to be accommodated in the coupler main body 8.

A plurality of valve grooves 13 having a semicircular cross section are formed along an axial direction of the bar-like portion 9b and at regular intervals with respect to a peripheral direction of the bar-like portion 9b. The valve grooves 13 formed so as to extend from a sharpened portion provided at the leading end of the bar-like portion 9b to the valve seat portion 9a. The fitting insertion portion 9c is composed of a larger diameter portion and a smaller diameter portion. The larger diameter portion has a diameter slightly smaller than the diameter of the axial hole 11, which is formed along the axis of the valve support 7.

Also as shown in FIG. 2A, the fitting insertion portion 9c is inserted into the axial hole 11 in the valve support 7. The valve seat portion 9a rests on the projecting portion 7b of the valve support 7. The bar-like portion 9b is directed upward. The leading end of the bar-like portion 9b is located below the upper edge of the coupler main body 8. Accordingly, the whole base valve 9 is accommodated in the coupler main body 8. That is, the base valve 9 is not exposed from the coupler main body 8.

The packing member 10 is made of an elastic material such as rubber similarly to the valve support 7. The packing member 10 is substantially cylindrical and has an outer diameter smaller than the inner diameter of the coupler main body 8. The inner diameter of the packing member 10 is larger than the diameter of the bar-like portion 9b of the base valve 9.

The packing member 10 rests on the valve seat portion 9a of the base valve 9, which has a tapered cross section. As previously described, the engaging concave portion 10a is formed in the outer peripheral surface of the packing member 10. The engaging projecting portion 8b of the coupler main body 8 engages with the engaging concave portion 10a. The engaging concave portion 10a engages with the engaging projecting portion 8b to position and retain the packing member 10 with respect to the coupler main body 8.

In this manner, the packing member 10 is supported by the base valve 9. Further, the lower end of the packing member 10 is fixedly sandwiched between the valve seat portion 9a of the base valve 9 and the engaging projecting portion 8b of the coupler main body 8. Accordingly, the packing member 10 completely closes the first hole portion 6a via the coupler main body 8 to seal the second hole portion 6b and the interior of the cell container 1.

The upper end surface of the packing member 10 is substantially flush with the leading end of the sharpened portion of the bar-like portion 9b of the base valve 9. The upper end of the packing member 10 has a smaller outer diameter than the other parts to avoid contact with a bayonet 15 as described later.

Figure 2B:
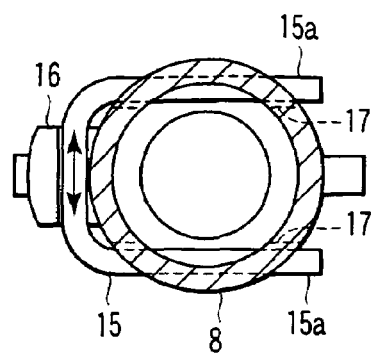
FIG. 2B is a sectional view taken along line B—B in FIG. 2A.

The bayonet 15 is attached to the upper end of the coupler main body 8. As shown in FIG. 2B, the bayonet 15 is, for example, a C ring obtained by molding a metal wire into the form of the letter C (in FIG. 2B, the bayonet 15 is more similar to the letter U). A part of the bayonet 15 which corresponds to a central portion of the letter C is engaged with a mounting groove portion 16 formed outside the coupler main body 8.

Moreover, two notch portions 17 are formed in the coupler main body 8. The notch portions 17 extend along a direction orthogonal to the mounting groove portion 16 and opposite to the opposite side ends of the mounting groove portion 16.

That is, the notch portions 17 are formed at the same height as that of the mounting groove portion 16 so as to extend from the outer peripheral surface to inner peripheral surface of the coupler main body 8. This forms-side grooves in a part of the coupler main body 8.

Opposite leg portions 15a of the bayonet 15 engage with the respective notch portions 17 of the coupler main body 8. The positions where the opposite leg portions 15a of the bayonet 15 engage with the notch portions 17 of the coupler main body 8 are at substantially the same height as that of the upper end of the packing member 10 and the sharpened portion of the bar-like portion 9b. Since the notch portions 17 are side grooves, the opposite leg portions 15a of the bayonet 15 engaged with the notch portions 17 protrude inward from the inner peripheral surface of the coupler main body 8 partly. Further, the opposite leg portions 15a of the bayonet 15 engaged with the notch portions 17 are entirely exposed from the coupler main body 8 as viewed from the front of FIG. 2A (from the front side of the sheet of FIG. 2A) or from the rear of the FIG. 2A (from the back side of the sheet of FIG. 2A).

The female coupler 5 is configured as described above.

On the other hand, the male coupler 20 is configured as described below.

An external thread 4a is formed on an outer peripheral surface of the supply port 4 in the supply container 2. A cartridge holder 22 is screwed around the external thread 4a. A cartridge valve 21 is disposed between the supply port 4 and the cartridge holder 22. The male coupler 20 is composed of the cartridge valve 21 and the cartridge holder 22.

The cartridge holder 22 is formed of the same synthetic resin as that of which the supply container 2 is formed. However, the cartridge holder 22 may be formed of, for example, a metal material without posing any problem. The cartridge holder 22 is shaped substantially like a box nut. An internal thread 22a is formed at the proximal end of the cartridge holder 22. The internal thread 22a can be screwed around the external thread 4a of the supply port 4. A substantially tapered leading end 22b is formed at the leading end of the internal thread 22a. The outer diameter of the leading end 22b is substantially the same as the inner diameter of the coupler main body 8 constituting the female coupler 5. Accordingly, the leading end 22b can be inserted into the coupler main body 8.

A locking step portion 23 is formed on an outer peripheral surface of the leading end 22b of the cartridge holder 22 and at a predetermined distance from the end surface of the leading end 22b. The radius of the locking step portion 23 is substantially the same as that of a cross section of the bayonet 15. A valve seat 25 is formed in the leading end 22b. The valve seat 25 contacts a valve portion 24 formed on a valve body 21a (described below) of the cartridge valve 21 to close the supply port 4. A supply hole 26 is formed in the leading end surface of the leading end 22b to allow the interior of the cartridge holder 22 to communicate with its exterior.

The cartridge valve 21 is formed of, for example, an elastic material such as a rubber material similarly to the packing member 10, constituting the female coupler 5. The upper end of the cartridge valve 21 in FIG. 2A is a disk-like base portion 21b. The valve body 21a, projecting downward, is integrated with the axial portion of the base portion 21b.

The periphery of the base portion 21b is fixedly sandwiched between the end surface of the supply port 4 and the cartridge holder 22. Moreover, a plurality of hole portions 27 are formed in the base portion 21b at predetermined intervals. One end of each of the hole portions 27 is located opposite to a shoulder portion of the cartridge holder 22 which connects the proximal end and leading end 22b of the cartridge holder 22, and closed by the shoulder portion of the cartridge holder. On the other hand, the other end of the hole portion 27 is open toward the inside of the supply port 4.

The valve body 21a has a predetermined thickness and a generally U-shaped cross section. The valve body 21a is accommodated in the leading end 22b of the cartridge holder 22 as previously described. The leading end of the valve body 21a is the hemispherical valve portion 24. The valve portion 24 abuts against the valve set 25 formed in the leading end 22b of the cartridge holder 22, to close the supply hole 26 in the supply port 4.

The male coupler 20 is configured as described above. Accordingly, as shown in FIGS. 1 and 2A, even if the supply container 2 is turned upside down or inclined to lie obliquely, the valve portion 24 of the cartridge valve 21 comes into contact with the valve seat 25 of the cartridge holder 22. This prevents the cell solution S stored in the supply container 2 from leaking out of the supply port 26.

To supply the cell solution S from the supply port 2 to the cell container 1, the supply container 2 is turned upside down as shown in FIGS. 1 and 2A. Then, the male coupler 20 attached to the supply port 4 is directed toward the female coupler 5 attached to the injection port 3 of the cell container 1. The leading end 22b of the cartridge holder 22, which constitutes the male coupler 20, is inserted into the upper end opening in the coupler main body 8, which constitutes the female coupler 5.

Figure 5:
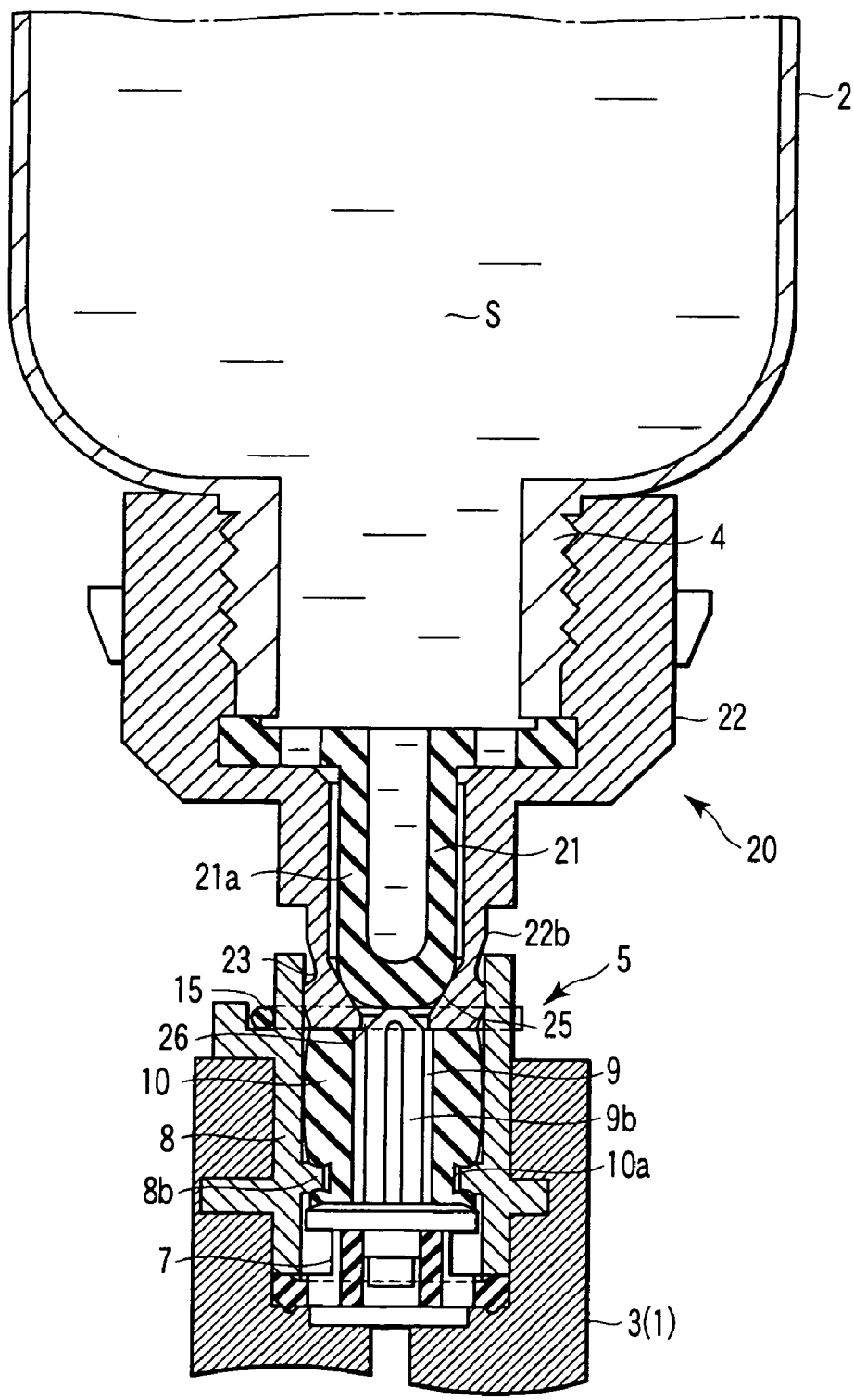
FIG. 5 is a sectional view of an initial stage of insertion of the male coupler into the female coupler according to the embodiment.

FIG. 5 is a sectional view showing that the male coupler 20 has been inserted into the coupler main body 8 of the female coupler 5 to push the leading end surface of the leading end 22b of the cartridge holder 22 about 0.5 mm downward from the position where the leading end surface abuts against the packing member 10.

As shown in FIG. 5, the valve body 21a of the cartridge valve 21 accommodated in the cartridge holder 22 contacts the valve seat 25, formed in the cartridge holder 22, to close the support port 4. This state is exactly the same as that shown in FIGS. 1 and 2A.

However, since the leading end 22b has pushed the packing member 10 0.5 mm downward, the leading end 22b of the cartridge holder 22 has entered the coupler main body 8. The end surface of the leading end 22b has contacted the packing member 10 to further push the packing member 10 downward.

On this occasion, the engaging concave portion 10a, formed in the lower part of the packing member 10, engages with the engaging projecting portion 8b of the coupler main body 8. Consequently, the pushdown by the leading end 22b of the cartridge holder 22 elastically deforms only the part of the packing member 10 located above the engaging concave portion 10a. The packing member 10 is deformed so as to swell in the radial direction. The outer peripheral surface of the packing member 10 thus contacts the inner peripheral surface of the coupler main body 8. However, the postures and positions of the base valve 9 and valve support 7 are not affected.

Further, the leading end of the bar-like portion 9b of the base valve 9 enters the supply port 26 in the leading end 22b. The leading end surface of the valve body 21a of the cartridge valve 21 contacts the leading end of the bar-like portion 9b. The position of end surface of the leading end 22b of the cartridge holder 22 is at substantially the same height as that of the bottom surface of the bayonet 15. Furthermore, the locking step portion 23, formed on the outer peripheral surface of the leading end 22b, enters the coupler main body 8.

Figure 6:
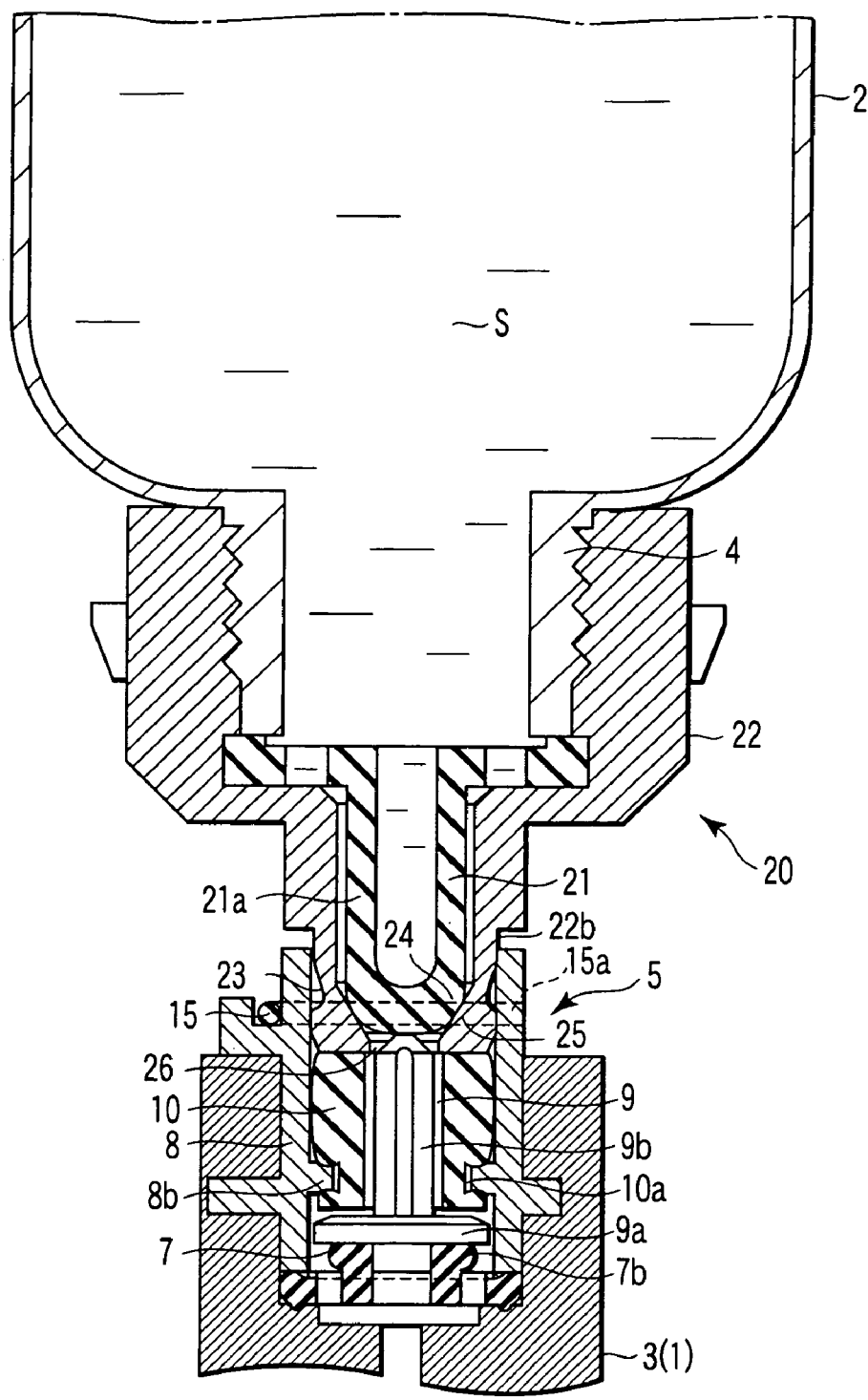
FIG. 6 is a sectional view of an intermediate stage of insertion of the male coupler into the female coupler according to the embodiment.

FIG. 6 shows that the supply container 2 has been pushed further about 0.5 mm downward from the position shown in FIG. 5.

FIG. 6 shows that the leading end 22b of the cartridge holder 22 has been advanced about 0.5 mm further from the position shown in FIG. 5, through the coupler main body 8. At this position, the maximum diameter part of the leading end portion 22b abuts against the opposite leg portions 15a of the bayonet 15 protruding inward from the coupler main body 8. The leading end 22b deforms the opposite leg portions 15a so as to open them outward.

Moreover, the leading end 22b of the cartridge holder 22 pushes down and further compress the packing member 10. The cartridge valve 21 exerts pressure on the base valve 9. Thus, the projecting portion 7b of the valve support 7 supporting the base valve 9 is elastically deformed to push down the base valve 9. The top surface of valve seat portion 9a of the base valve 9 thus leaves the lower end surface of the packing member 10. This forms a gap between the valve seat portion 9a and the packing member 10. However, at this stage, the valve portion 24 of valve body 21a of the cartridge valve 21 still abuts against the valve seat 25 of the cartridge holder 22. The supply port 4 in the supply container 2 is thus still closed.

Figure 7:
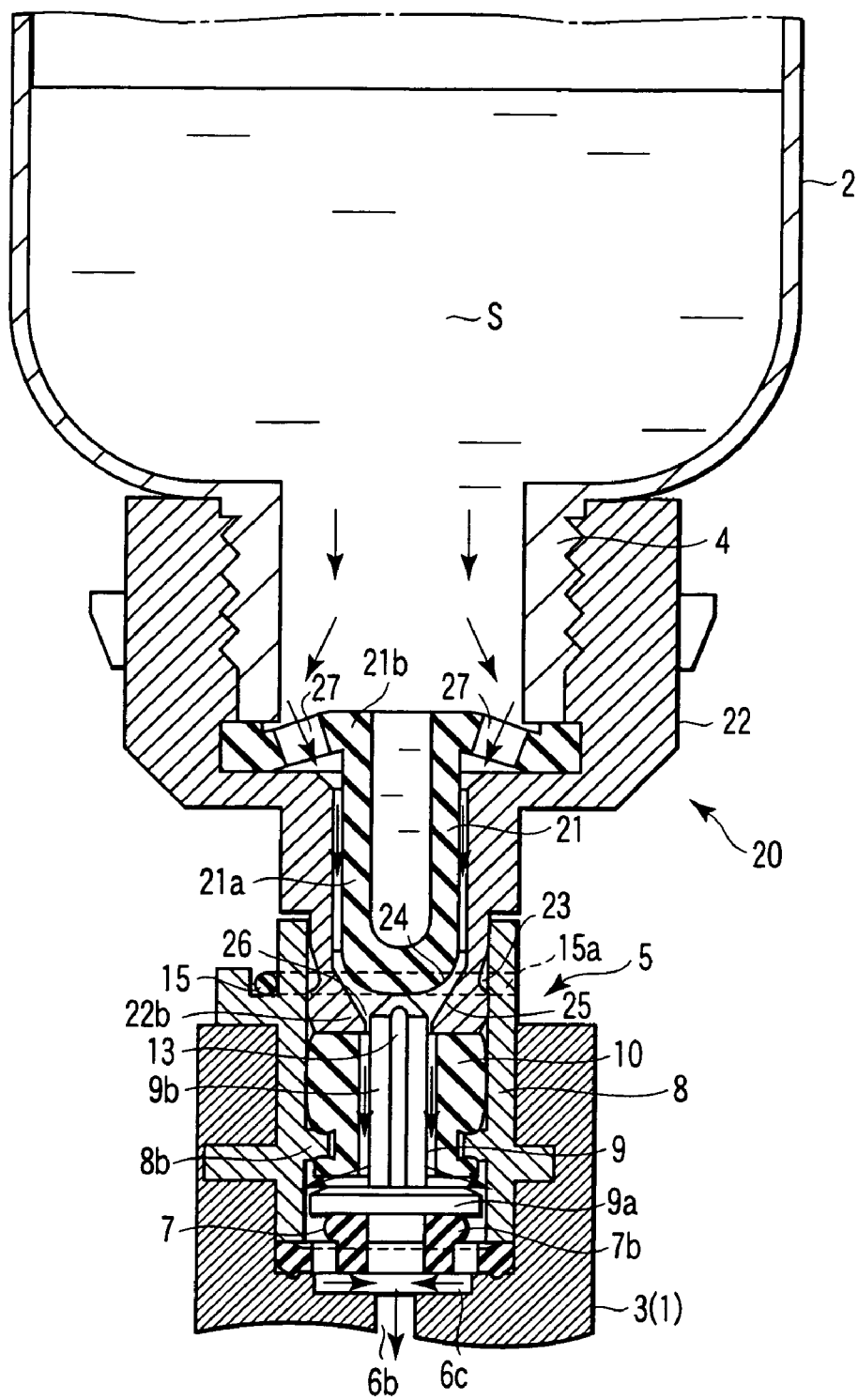
FIG. 7 is a sectional view of a final stage of insertion of the male coupler into the female coupler according to the embodiment.

FIG. 7 shows that the supply container 2 has been pushed further about 0.5 mm downward from the position shown in FIG. 6.

On this occasion, the maximum diameter portion of the leading end 22b of the cartridge holder 22 climbs over the opposite leg portions 15a of the bayonet 15. Owing to their elastic force, the leg portions 15a engage with the locking step portion 23, formed in the leading end 22b.

That is, upon holding the supply container 2 and advancing the male coupler 20 about 1.5 mm through the female coupler 5 of the cell container 20, the operator gets a click feeling. This significantly improves the operability of the device.

In this state, the leading end 22b of the cartridge holder 22 further pushes down the packing member to further compress the part of the packing member 10 located above the engaging concave portion 10a. The cartridge valve 21 further pushes down the base valve 9. However, the projecting portion 7b of the valve support 7 supporting the base valve 9 has already been compressed to the limit, so that the amount by which the base valve 9 is pushed down is almost zero.

On the other hand, the end surface of the valve body 21a abuts against the leading end of the bar-like portion 9b of the base valve 9, which thus restricts further pushdown of the cartridge valve 21. Consequently, on the contrary, the valve body 21a is pushed up by the base valve 9, thus affecting the base portion 21b.

As previously described, only the periphery of the base portion 21b is fixedly sandwiched between the cartridge holder 22 and the end surface of the supply port 4. However, the part of the base portion 21b located between the sandwiched part and the central axis is not restricted.

Accordingly, when the pushup force from the base valve 9 reaches the base portion 21b via the valve body 21a, the whole base portion 21b except for its periphery is elastically deformed obliquely. This pushes up the valve body 21a to separate the valve portion 24 from the valve seat 25 at the leading end 22b of the cartridge holder 22. As a result, a gap is formed between the valve portion 24 and the valve seat 25.

The cell solution S stored in the supply container 2 is guided to the supply hole 26 in the cartridge holder 22 through the gap between the outer peripheral surface of the valve body 21a and the inner peripheral surface of the leading end 22b of the cartridge holder 22, as shown by the arrows in FIG. 7. The cell solution S is then guided through the gap between the valve portion 24 and the valve seat 25 and then along the valve groove 13, formed in the bar-like portion 9b of the base valve 9.

The gap is still present between the top surface of valve seat portion 9a of the base valve 9 and the lower end surface of the packing member 10, the cell solution S guided from the valve groove 13 flows through the gap.

The cell solution S is further guided through the gap between the outer peripheral surface of valve seat portion 9a of the base valve 9 and the inner peripheral surface of the coupler main body 8 and then onto the base portion 7a of the valve support 7. Then, the cell solution S is guided through the guide hole 12, formed in the base portion 7a of the valve support 7, and then into the concave portion 6c. The cell solution S finally flows into the cell container 1 through the second hole portion 6b.

In this manner, the cell solution S in the supply container 2 is filled in the cell container 1 when the operator simply advances the male coupler 20 of the supply container 2 through the female coupler 5 of the cell container 1 to a predetermined depth (about 1.5 mm).

No gap is formed between the valve portion 24 and the valve seat 25 until the male coupler 20 has been advanced to the predetermined depth. Consequently, no solution leaks during the insertion.

Once the male coupler 20 is advanced to the predetermined depth, the locking step portion 23 at the leading end 22b of the cartridge holder 22 engages with the bayonet 15. Consequently, the operator can get a click feeling to easily sense that the inserting operation has been finished.

In a supply state, the cell solution S is smoothly guided with no solution leaking.

Once a predetermined amount of cell solution S is supplied, the operator removes the male coupler 20 of the supply container 2 from the female coupler 5 of the cell container 1. Accordingly, the operation proceeds reversely from the state in FIG. 7 through the states in FIGS. 6 and 5 back to the state in FIG. 2A. In particular, when the state in FIG. 7 changes to the state in FIG. 6, the operator can allow the locking step portion 23 of the cartridge holder 22 to slip out of the bayonet 15 simply by holding the cell container 1 by one hand and raising the supply container 2 by about 0.5 mm. On this occasion, the supply container 2 can be raised almost only by the strength of a finger and no particularly large strength is required.

At the same time, the valve body 21a of the cartridge valve 21 is pushed back to abut the valve portion 24 against the valve seat 25. The valve portion 24 thus comes into contact with the valve seat 25 tightly. Consequently, the male coupler 20 of the supply container 2 is closed before the male coupler 20 is completely removed from the female coupler 5. This prevents leakage after the completion of the removal or a dribbling phenomenon.

As described above, when the cell solution S from the supply container 2 is supplied to the cell container 1, almost only the strength of fingers is required to perform operations of connecting the supply container 2 to the cell container 1, supplying the cell solution S, and removing the supply container 2 from the cell container 1. This improves the operability of the device. Further, the cell solution S remains prevented from leaking out from beginning to end of the operation. This improves the reliability of the device.

When the fuel cell is used for a long period, the cell container 1 is filled with a gas resulting from electrolysis. The internal pressure of the cell container 1 thus increases. Even if the male coupler 20 of the supply container 2 is connected to the female coupler 5 of the cell container 1 to create a gap between the valve portion 24 and the valve seat 25 as previously described, the high pressure of the cell container 1 prevents the supply of the cell solution S from the supply container 2.

Figure 8A:
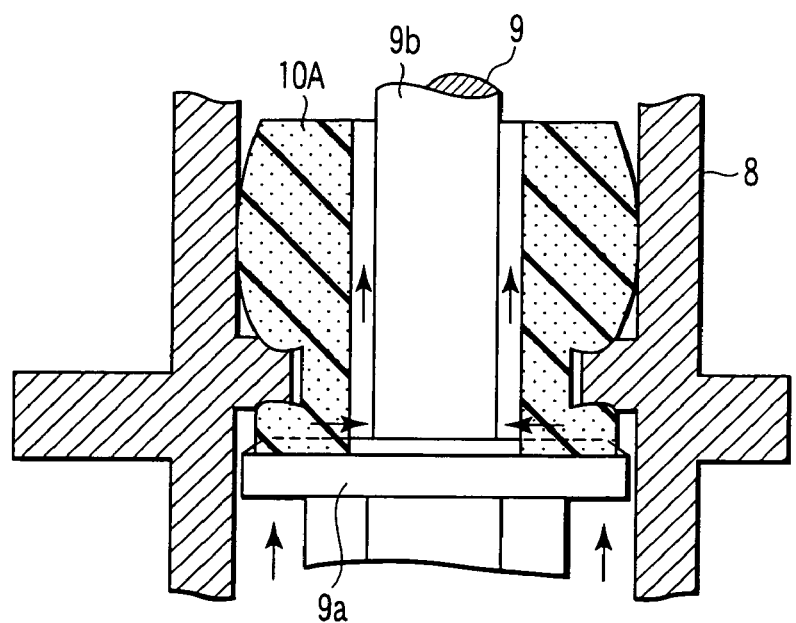
FIG. 8A is a sectional view of a packing member according to a variation of the embodiment.
Figure 8B:
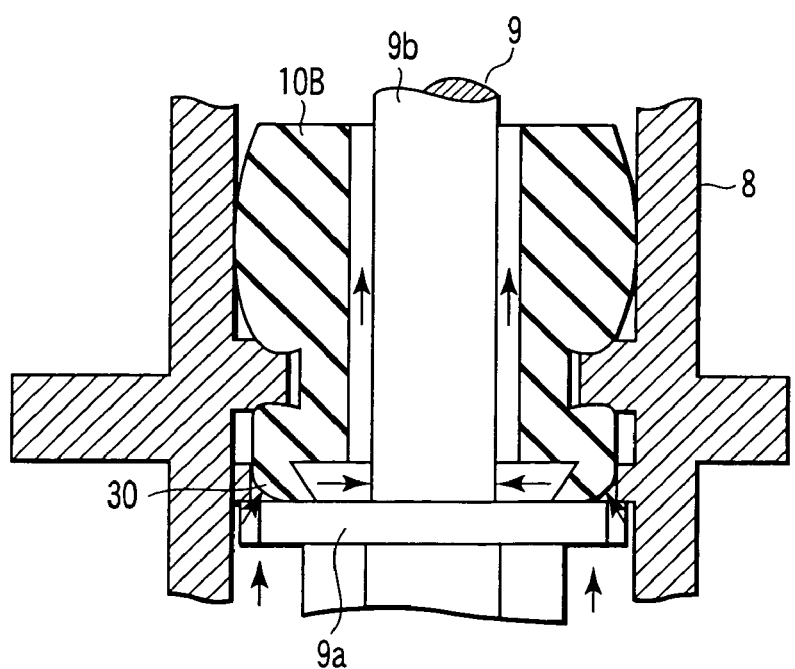
FIG. 8B is a sectional view of the packing member according to a variation of the embodiment.

Thus, the configuration shown in FIG. 8A or 8B is adopted to cause natural deaeration when the internal pressure of the cell container 1 increases so that the interior of the cell container 1 is always maintained at, at most, a set pressure.

In FIG. 8A, a packing member 10A is used which is made of, for example, a sponge member having a large number of pores. As shown in FIG. 8A, the packing member 10A can be elastically deformed smoothly. Further, a gas can flow among the particles constituting the materiel regardless of before or after the packing member 10A is deformed. Therefore, the gas in the cell container 1 is smoothly deaerated to suppress an increase in the internal pressure of the container.

In FIG. 8B, the material of the packing member 10B is a rubber material as previously described. However, the lower end of the packing member 10B supported on the valve seat portion 9a of the base valve 9 is formed to be concave except for its periphery. Thus a tongue piece 30 is integrated with the lower end of the backing member 10B. The tongue piece 30 rests on the valve seat portion 9a of the base valve 9.

An increase in the internal pressure of the cell container 1 affects the outer peripheral surface of the tongue piece 30 of the packing member 10B. Since the tongue piece 30 is thin, it is deformed under the internal pressure so as to be folded inward as shown in FIG. 8B.

Therefore, a gap is formed between the tongue piece 30 and the valve seat portion 9a of the base valve 9. A gas in the cell container 1 flows out smoothly through the gap. As a result, the interior of the cell container 1 is deaerated to suppress an increase in the internal pressure of the cell container 1.

Moreover, the present invention is not limited to the above configurations. Many variations may be adopted without departing from the characteristics of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A female coupler provided at an injection port in a liquid tank and which is normally closed and is opened when a liquid is supplied to the liquid tank, the female coupler comprising:

a valve support accommodated in a hole portion of the injection port and comprising a projecting portion having a axial hole formed along an axis of the injection port;

a cylindrical coupler main body placed around a periphery of the projecting portion of the valve support and comprising a locking projecting portion on an inner peripheral surface, a part of the coupler main body being embedded in the injection port so as to have its position fixed;

a base valve accommodated in the coupler main body and having an fitting insertion portion inserted into the axial hole in the valve support and a valve seat portion placed on the projecting portion of the valve support, the fitting insertion portion and the valve seat portion being connected together;

a bar-like portion projected from the valve seat portion of the base valve and having a plurality of valve grooves formed on a peripheral surface along an axial direction; and an elastically deformable packing member placed on the valve seat portion of the base valve and accommodating the bar-like portion, the packing member being partly fixedly retained in the coupler main body, wherein in a normal state, the packing member is partly sandwiched between the valve seat portion of the base valve and the locking projecting portion of the coupler main body to retain a sealed state, and the bar-like portion of the base valve is pressed to elastically deform the projecting portion of the valve support via the valve seat portion to form a gap between the valve seat portion and an end surface of the packing member, and a liquid flows from the valve grooves through the gap between the valve seat portion and the packing member and is then filled into an interior of the liquid tank.

2. The female coupler according to claim 1, wherein the coupler main body comprises a bayonet used to hold a position of a pressing member which presses the bar-like portion of the base valve.

3. The female coupler according to claim 1, wherein the packing member is made of a sponge material having a large number of pores through which a gas in the liquid tank can flow.

4. The female coupler according to claim 1, wherein the packing member comprises a tongue piece opposite to the valve seat portion of the base valve.

5. The female coupler according to claim 2, wherein the packing member is made of a sponge material having a large number of pores through which a gas in the liquid tank can flow.

6. The female coupler according to claim 2, wherein the packing member comprises a tongue piece opposite to the valve seat portion of the base valve.

7. A male coupler provided at a supply port in a liquid retaining container and which is normally closed and is opened when a liquid from the liquid retaining container is supplied to the exterior, the male coupler comprising:

a cartridge holder attached to the supply port and comprising, at its leading end, a valve seat and a supply hole which is in communication with the valve seat;

a cartridge valve comprising a valve body comprising a valve portion inserted into a leading end of the cartridge holder and abutting against the valve seat to close the supply hole and a base portion provided at a proximal end of the valve body, only a peripheral portion of the base portion being fixedly sandwiched between the supply port and the cartridge holder; and a hole portion formed in the base portion of the cartridge valve, wherein in a normal state, the valve portion of the cartridge valve abuts against the valve seat located at the leading end of the cartridge holder to retain a sealed state, and the valve body of the cartridge valve is pressed through the supply hole to elastically deform the base portion of the cartridge valve to form a gap between the valve portion and the valve seat, and a liquid is supplied to the exterior through the gap.

* * * * *